US006291825B1

(12) United States Patent
Scharf et al.

(10) Patent No.: US 6,291,825 B1
(45) Date of Patent: Sep. 18, 2001

(54) METHOD AND APPARATUS FOR PERFORMING PULSE PILE-UP CORRECTIONS IN A GAMMA CAMERA SYSTEM

(75) Inventors: Thomas E. Scharf, San Jose; Michael J. Petrillo; Donald R. Wellnitz, both of Pleasanton, all of CA (US)

(73) Assignee: ADAC Laboratories, Milpitas, CA (US)

( * ) Notice: Subject to any disclaimer, the term of this patent is extended or adjusted under 35 U.S.C. 154(b) by 0 days.

(21) Appl. No.: 09/178,522

(22) Filed: Oct. 23, 1998

(51) Int. Cl.$^7$ .................................................. G01T 1/208

(52) U.S. Cl. ................ 250/369; 250/363.02; 250/363.03

(58) Field of Search ............................. 250/369, 363.02, 250/363.03

(56) References Cited

U.S. PATENT DOCUMENTS

| | | |
|---|---|---|
| 4,071,761 | 1/1978 | Horrocks . |
| 4,181,855 | 1/1980 | Horrocks . |
| 4,418,282 | 11/1983 | Horrocks . |
| 5,210,423 * | 5/1993 | Arseneau ............................. 250/369 |
| 5,296,708 | 3/1994 | Moyers et al. . |
| 5,444,252 | 8/1995 | Hug et al. . |
| 5,461,232 | 10/1995 | McCandless et al. . |
| 5,471,061 | 11/1995 | Moyers et al. . |
| 5,493,120 | 2/1996 | Geagan . |
| 5,552,606 | 9/1996 | Jones et al. . |
| 5,565,684 | 10/1996 | Gullberg et al. . |
| 5,585,637 | 12/1996 | Bertelsen et al. . |
| 5,608,221 | 3/1997 | Bertelsen et al. . |
| 5,646,408 | 7/1997 | Goldberg et al. . |

OTHER PUBLICATIONS

James A. Sorenson, Ph.D., et al., *Physics in Nuclear Medicine*, W.B. Saunders Company, 2nd Ed., Philadelphia, 1987, pp. 438–442.

Robert Anthony Dekemp, B.A.Sc., Attenuation Correction Position Emission Tomography Single Photon Transmission Measurement, Sep. 1992, McMaster Univ., Hamilton (ON), 106 pp.

Siu K. Yu and Claude Nahmias, Single Photon Transmission Measurements In Positron Tomography Using $^{137}$Cs, 1995, McMaster Univ., Hamilton (ON), 29 pgs.

Karp, et al., Singles Transmission In Positron Emission Tomography Using $^{137}$Cs, from 1995 IEEE Nuclear Science Symposium and Medical Imaging Conference record vol. 13, University of Pennsylvania and UGM Medical Systems (Philadelphia, PA), pp. 1363–1367.

P. Nellemann, et al., Performance Characteristics of a Dual Head Spect Scanner with Pet Capability, From 1995 IEEE Nuclear Science Symposium conference record vol. 3, ADAC Laboratories and UGM Laboratory, pp. 1751–1755.

(List continued on next page.)

Primary Examiner—Constantine Hannaher
Assistant Examiner—Andrew Israel
(74) Attorney, Agent, or Firm—Jordan M. Becker

(57) ABSTRACT

A method and apparatus for selectively integrating PMT channel signals in a gamma camera system are described. A trigger word is decoded to determine which of multiple PMT channels are affected by a given scintillation event. When two scintillation events overlap both spatially and temporally, only those channels which are affected by both events stop integrating in response to the second event. Pre-pulse pile-up is corrected by removing the tail of a preceding pulse from a current pulse using an approximation of the tail of the preceding pulse based upon the instantaneous energy of the current pulse and the current countrate. Extrapolation of the tail of the current pulse may also be performed in essentially the same manner.

34 Claims, 14 Drawing Sheets

OTHER PUBLICATIONS

Karp, et al., Singles Transmission in Volume–Imaging Pet With a $^{137}$Cs Source, Phys. Med. Biol., vol. 40, 1995, pp. 929–944.

Bailey, et al., Ecart Art—A Continuously Rotating Pet Camera: Performance Characteristics, Initial Clinical Studies, And Installation Considerations In A Nuclear Medicine Department, European Journal of Nuclear Medicine, vol. 24, No. 1, Jan. 1997, London (UK) and Knoxville (TN), 10 pgs.

Robert A. De Kemp, et al., Attenuation Correction In Pet Using Single Photon Transmission Measurement, Med. Phys., vol. 21, No. 6, Jun. 1994, pp. 771–778.

G. Muehllehner, et al., "Performance Parameters of a Positron Imaging Camera," IEEE Transactions On Nuclear Science, vol. NS–23, Feb. 1976, pp. 528–537.

R.A. De Kemp, et al., Design And Performance Of 3D Photon Transmission Measurement On A Positron Tomograph With Continuously Rotating Detectors, International Meeting on Fully Three–Dimensional Image Reconstruction in Radiology and Nuclear Medicine, 1995, Ottowa and Hamilton (ON), Knoxville (TN), pp. 51–54.

Gerd Muehllehner, Positron Camera With Extended Counting Rate Capability, Journal of Nuclear Medicine, vol. 15, No. 7, Jul. 1975, pp. 653–657.

Karp et al., Continuous–Slice Penn–Pet: A Positron Tomograph With Volume Imaging Capability, Journal of Nuclear Medicine, vol. 13, No. 5, May 1990, pp. 617–627.

R.J. Smith et al., "Singles Transmission Scans Performed Post–Injection for Quantitative Whole Body Pet Imaging," 1996 IEEE Nuclear Science Symposium Conference Record, vol. 3, Nov. 1996, Philadelphia (PA), 7 pgs.

Karp, et al., Abstract No. 156 From proceedings of the 41st Annual Meeting, Scientific Papers, vol. 35, No. 5, Attenuation Correction In Pet Using A Singles Transmission Source, May 1994, Philadelphia (PA), p. 41P.

G. Muehllehner, et al., Abstract No. 284, From proceedings of the 42nd Annual Meeting Scientific Papers, Spect Scanner With Pet Coincidence Capability, Journal of Nuclear Medicine, Jun. 14, 1995, p. 70P.

Glenn F. Knoll, University of Michigan, Radiation Detection and Measurement, Second Edition, John Wiley & Sons, Inc., New York, 1979, pp. 120–129 and 597–598.

James K. O'Donell, M.D., "Nuclear Medicine Camera Improves Image Quality and Patient Throughput", Advance for Administrators in Radiology, Aug. 1997, pp. 82–83.

Wong, W.H. et al., "A Scintillation Detector Signal Processing Technique with Active Pileup Prevention for Extending Scintillation Count Rates," IEEE Nuclear Science Symposium and Medical Imaging Conference, Albuquerque, New Mexico, Nov. 9–15, 1997, 5 pages.

Abstract, Wong, W.H. et al., "An Ultra–High Count–Rate Position Decoding and Energy Measuring Method for Cameras Using Anger Logic Detectors", 1997 IEEE Nuclear Science Symposium and Medical Imaging Conference, Albuquerque, New Mexico, Nov. 9–15, 1997, p. 88.

Lewellen, Thomas K., et al., "Evaluation of a Clinical Scintillation Camera with Pulse Tail Extrapolation Electronics", The Journal of Nuclear Medicine, vol. 30, Sep. 1989, 1554–1558.

P. Stentstrom et al., "A New Scalable Modular Data Acquistion System for SPECT (PET)", IEEE Transactions on Nuclear Science, vol. 45, No. 3, Jun. 1998, pp. 1117–1121.

International Commission on Radiation, Units and Measurements, "The Poisson Process", Particle Counting in Radioactivity Measurements, ICRU Report 52, Bethesda, MD, Nov. 1994, pp. 3–17.

Wong, Wai–Hoi, et al., "A High Count Rate Position Decoding and Energy Measuring Method for Nuclear Cameras Using Anger Logic Detectors", IEEE Transactions on Nuclear Science, vol. 45, No. 3, Jun. 1998, pp. 1122–1127.

D.–C. Yu, et al., "Extending the Usable Areas of Modular NaI(Tl) Detector Using Crystal Treatment", IEEE, May 1998, 4 pages.

* cited by examiner

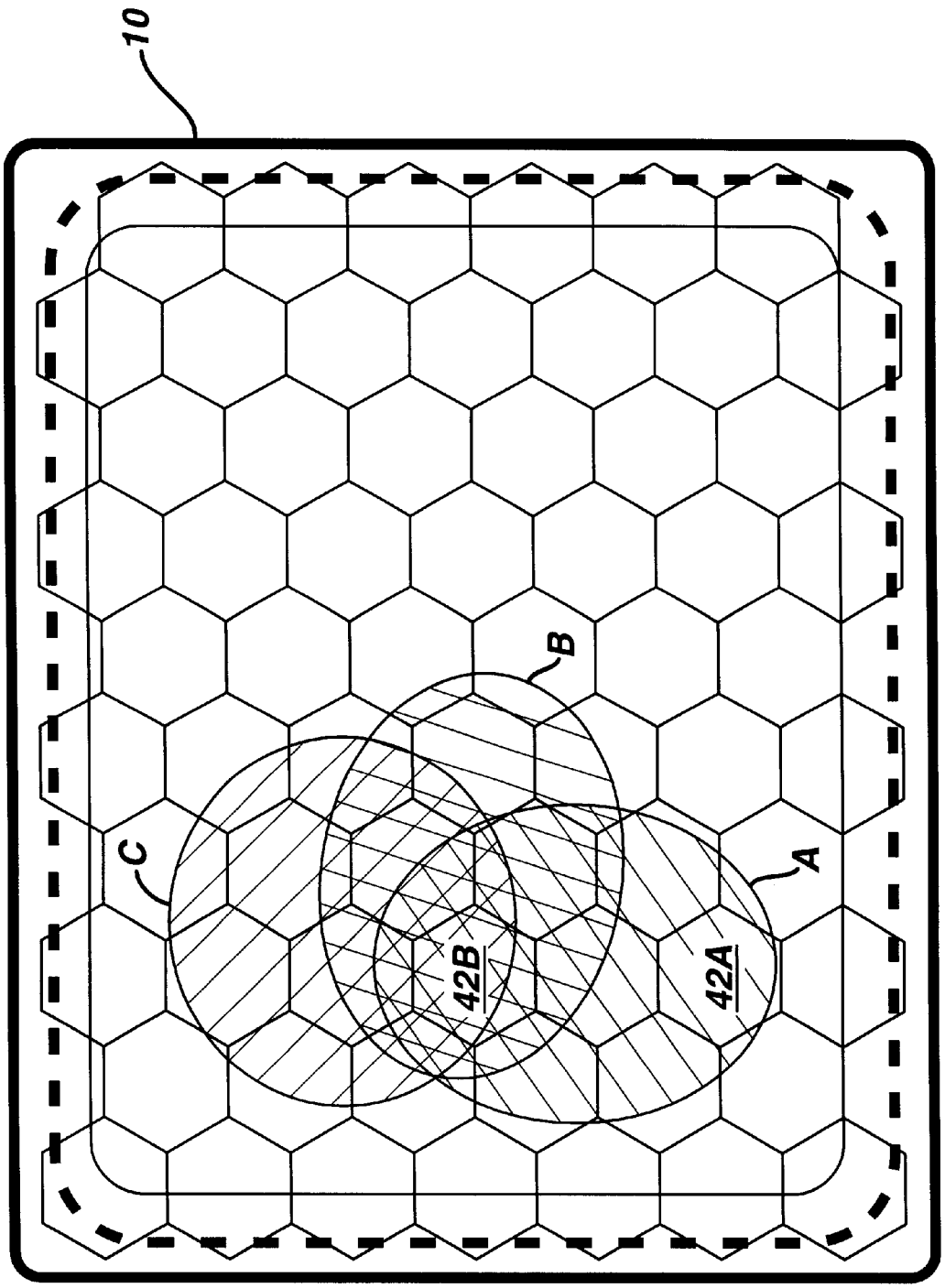

atus for performing pulse pile-up corrections in a gamma camera system are described.

METHOD AND APPARATUS FOR PERFORMING PULSE PILE-UP CORRECTIONS IN A GAMMA CAMERA SYSTEM

FIELD OF THE INVENTION

The present invention pertains to the field of nuclear medicine. More particularly, the present invention relates to the integration and correction of channel signals in a nuclear medicine imaging system in response to pulse pile-up.

BACKGROUND OF THE INVENTION

In nuclear medicine, images of internal structures or functions of the body are acquired by using one or more gamma cameras to detect radiation emitted by a radio pharmaceutical that has been injected into the patient's body. A computer system controls the gamma cameras to acquire data and then processes the acquired data to generate images. Nuclear medicine imaging techniques include single photon emission computed tomography (SPECT) and positron emission tomography (PET). SPECT imaging is based on the detection of individual gamma rays emitted from the body, while PET imaging is based on the detection of gamma ray pairs resulting from electron-positron annihilations and emitted in coincidence with each other. Accordingly, PET imaging is sometimes referred to as coincidence imaging. Nuclear medicine imaging systems, which are sometimes referred to as gamma camera systems, include dedicated SPECT systems, dedicated PET systems, and systems having dual PET/SPECT capability. Gamma camera systems with dual PET/SPECT capability are available from ADAC Laboratories of Milpitas, Calif.

Gamma camera detectors typically include a number of photomultiplier tubes (PMTs), which provide electrical outputs in response to scintillation events occurring within a scintillation crystal. Electronic circuitry generally processes the output of each PMT. Accordingly, each PMT and its associated electronics may be referred to as a "channel". The output of a PMT may therefore be referred to as a PMT "channel signal". The channel signals are amplified and integrated to determine the total amount of energy associated with a given scintillation event. Scintillation events are represented as pulses in the channel signals.

One problem associated with gamma camera systems is pulse pile-up. Pulse pile-up is the occurrence of two scintillation-based pulses so close together in time that they overlap. Pulse pile-up distorts energy information and contributes to deadtime losses and can therefore cause inaccuracies in the imaging process. Pulse pile-up may be categorized into two different types: pre-pulse pile-up and post-pulse pile-up. Pre-pulse pile-up refers to the situation in which a pulse of interest is overlapped by the "tail" (trailing portion) of a preceding pulse. Post-pulse pile-up refers to the situation in which a subsequent pulse occurs before integration of the pulse of interest has been completed.

In certain prior art gamma camera systems, the problem of post-pulse pile-up has been addressed by causing integration of all channels to stop in response to each pile-up event. The partially integrated channel signals are then corrected for pre-pulse pile-up, post-pulse pile-up, or both, using an appropriate technique. This approach is disadvantageous, however, because valuable energy and position information is lost when integration of all channels is stopped, even though the pile-up may not have affected all channels. This approach becomes particularly problematic in the context of a system capable of both PET and SPECT imaging. For example, a dual PET/SPECT system which employs a single, contiguous NaI (Tl) crystal in each camera may experience ultra high counting rates (e.g., five to six million events per second) when the system is operated in PET mode. At such high counting rates, stopping integration of all channels, even for a very brief period of time, causes a substantial loss of information.

In addition, certain pre-pulse pile-up correction and pulse tail extrapolation techniques use an exponential approximation of the tail of a pulse. However, such an approach generally relies upon precise knowledge of when the beginning of the pulse occurred and tends to be computationally intensive.

What is needed, therefore, is a gamma camera system, which overcomes these and other disadvantages of the prior art.

SUMMARY OF THE INVENTION

A method and apparatus for determining the tail of a pulse representing a scintillation event are provided. A pulse is detected, and a countrate associated with the pulse is determined. The tail of the pulse is then estimated as a function of the countrate. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which:

FIG. 9 illustrates the coverage of three scintillation events on the imaging surface of a detector.

DETAILED DESCRIPTION

A method and apparatus for correcting for pulse pile-up in a gamma camera system are described. The correction technique may be used for purposes of pre-pulse pile-up correction of a current pulse, i.e., to estimate the tail of a preceding, overlapping pulse, for purposes of correcting the current pulse. In addition, the technique may be used for purposes of pulse tail extrapolation (post-pulse pile-up), i.e., to estimate the tail of a current pulse when integration of the current pulse is stopped due to a subsequent, overlapping pulse. Briefly, the technique is as follows. To estimate the tail of a pulse, the instantaneous energy of the pulse and the current countrate are determined, and the tail of the pulse is computed as an approximation based on both the instantaneous energy and the countrate. This approach is advantageous in that it does not require precise knowledge of the start time of the pulse, nor does it require intensive, time-consuming computations.

The described technique is particularly well-suited for use in a gamma camera system capable of both single-photon (SPECT) and coincidence (PET) imaging. Note, however, that this technique can also be used advantageously in a dedicated coincidence (PET) imaging system or in a dedicated SPECT system.

Figure 1:
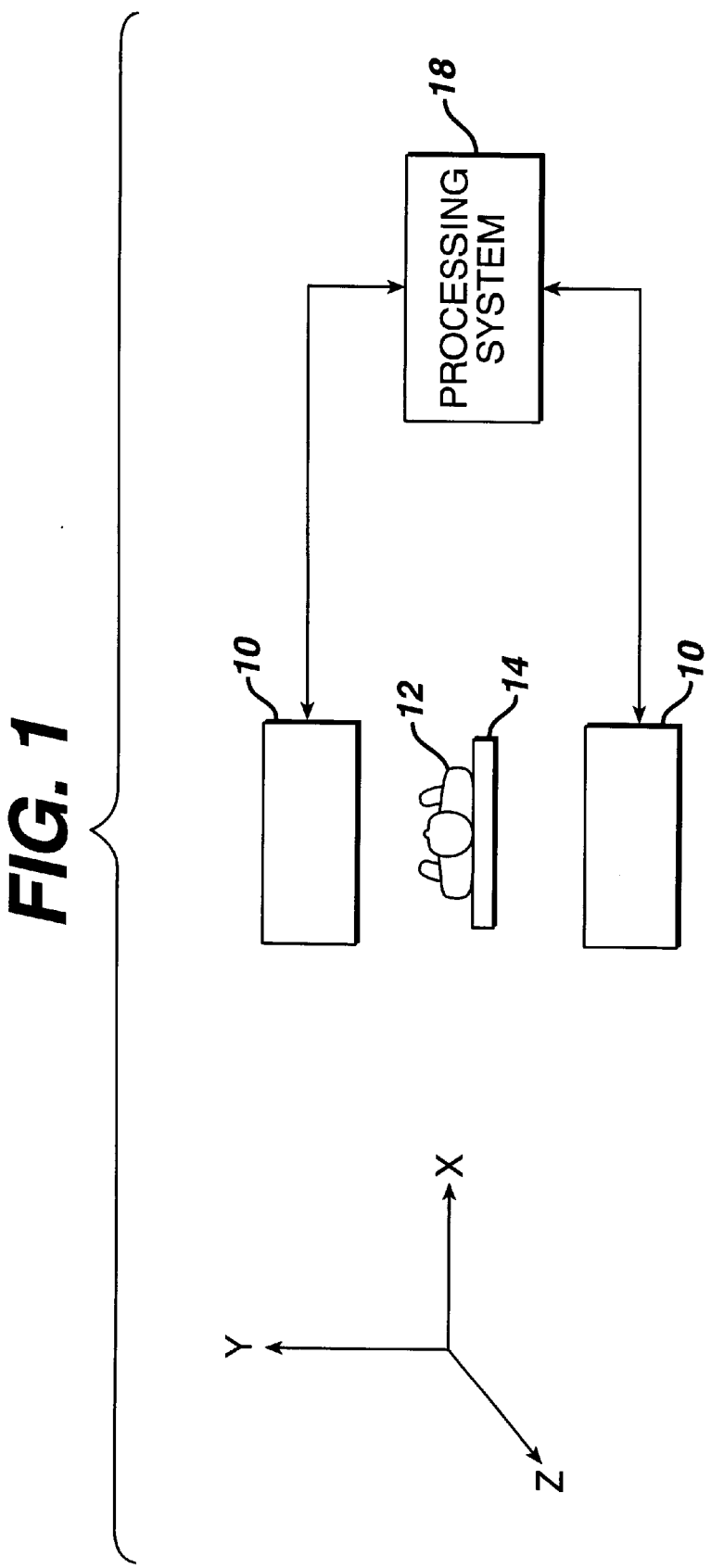
FIG. 1 is a block diagram of a gamma camera system.

FIG. 1 is a block diagram of a dual-detector gamma camera system capable of both single-photon and coincidence imaging, in which the selective integration technique can be implemented. The system of FIG. 1 includes a processing system 18 coupled to two scintillation detectors 10. As will be described further below, each of the detectors 10 includes components for detecting scintillation events in response to gamma radiation and for providing data representing detected events to the processing system 18 via the DATA signals. The detectors 10 may be supported by a gantry that is capable of rotating the detectors 10, either individually or in unison, about an axis of rotation that is perpendicular to the x-y plane (parallel to the z axis), and of moving the detectors along the z axis. A patient 12 rests on a table 14 positioned between the detectors 10. The detectors 10 are configured in a 180 degree orientation relative to each other about an axis of rotation that passes through the patient 12 parallel to the z axis, as is appropriate for coincidence imaging.

The processing system 18 controls the overall operation of the gamma camera system, including receiving data acquired by the detectors 10, processing the data, and reconstructing images based on the data. The processing system 18 controls certain functions of the detectors 10 using various control signals. The processing system 18 may be, or may include, for example, one or more of: a conventional computer system, such as a personal computer (PC), a server and/or workstation, a single-board computer, or a combination of such devices. Note that in alternative embodiments, however, any of the above-mentioned functions of the processing system 18, or aspects thereof, may instead be implemented within the detectors 10, the gantry, or in other distinct modules. Thus, processing system 18 may actually be embodied as multiple distinct processing systems.

Figure 2:
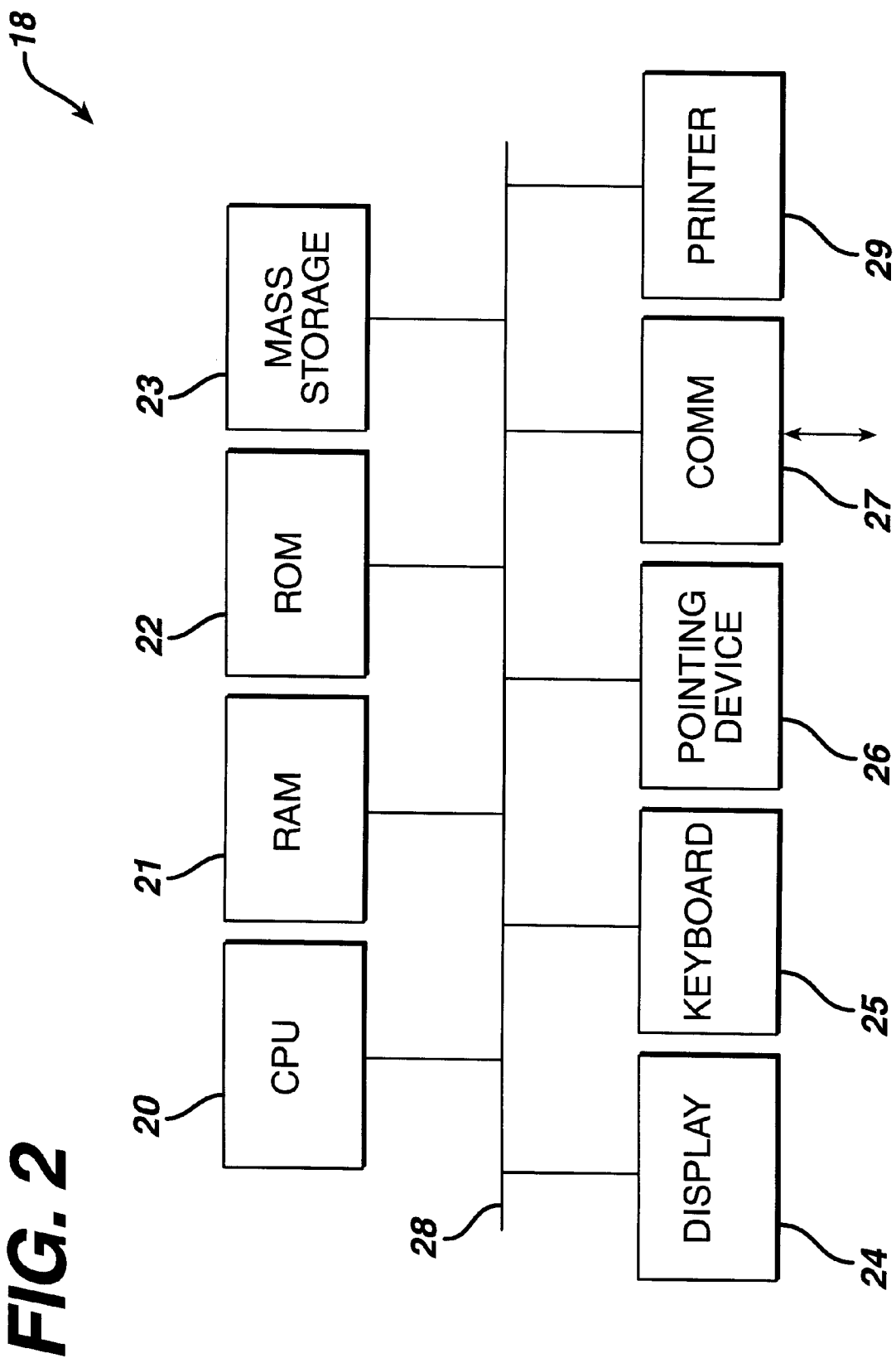
FIG. 2 is a block diagram of the processing system of the gamma camera system.

FIG. 2 illustrates a block diagram of the processing system 18 according to one embodiment. In the illustrated embodiment of FIG. 2, the processing system 18 includes a central processing unit (CPU) 20, random access memory (RAM) 21, read-only memory (ROM) 22, and a mass storage device 23, each coupled to a bus system 28. The bus system 28 may represent multiple physical buses coupled together by appropriate bridges, controllers, and/or adapters. Also coupled to the bus system 28 are a display device (including appropriate display controller) 24, which may be a cathode ray tube (CRT), liquid crystal display (LCD), or the like; a keyboard 25; a pointing device 26, such as a mouse, trackball, touchpad, or the like; a communication device 27; and a printer 29. Communication device 27 may be to implement the DATA and CTRL signals to and/or from the detectors 10 and/or other computer systems or components. Communication device 27 may be, for example, a simple transceiver, a network adapter, a modem, or any other suitable data communication device. Display device 24 and printer 29 may be used to display and print, respectively, tomographic images reconstructed by processing system 18.

Figure 3:
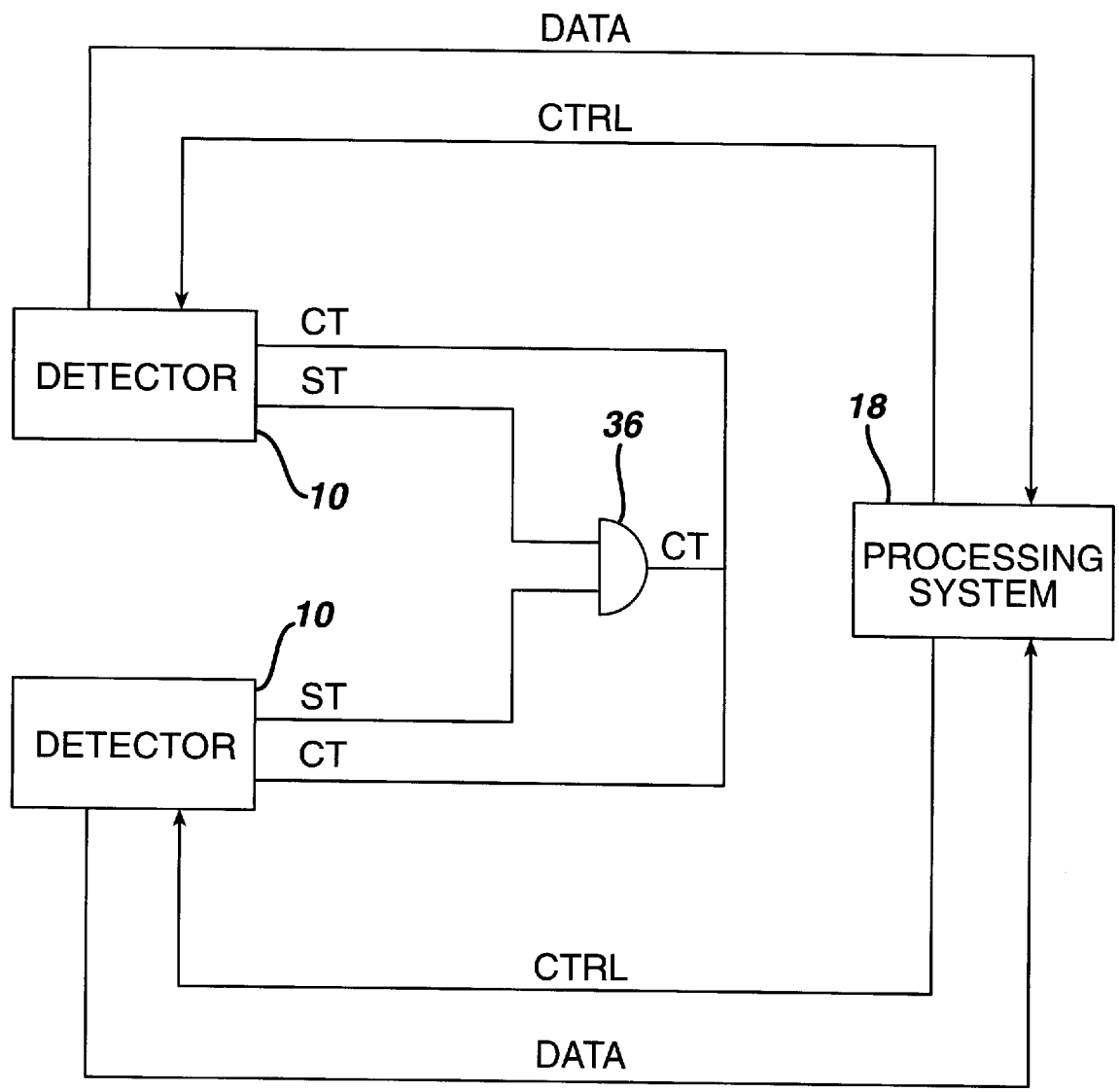
FIG. 3 is a block diagram of the gamma camera system showing the coincidence detection circuitry (CDC).

FIG. 3 illustrates the coincidence detection circuit of the gamma camera system, which enables the system to detect coincidence events. As shown, each of the detectors 10 outputs trigger pulses via singles trigger signals ST in response to each detected scintillation event. The singles trigger signal ST from each detector is applied to an input of the coincidence detection circuit (CDC) 36, which outputs a coincidence trigger signal CT to each of the detectors 10. The CDC 36 may be a simple AND gate, as shown on FIG. 3. When the system is in coincidence mode, each of the detectors 10 responds to assertion of the coincidence trigger signal CT by registering the position and energy of the corresponding scintillation event. When the system is in single-photon mode, each of the detectors 10 registers position and energy data in response to assertion of its singles trigger signal ST; the coincidence trigger signal CT is not used. Position data (i.e., x,y coordinates) and energy data for registered events are provided by each of the detectors 10 to the processing system 18 via the DATA signals. The processing system 18 controls certain functions of the detectors 10 using various control (CTRL) signals. The CTRL signals may include clock signals for controlling data transfers, programming signals for programming variable delays, selecting the imaging mode (PET or SPECT) and other functions, and other signals, the specifics of which are not germane to the present invention.

Figure 4:
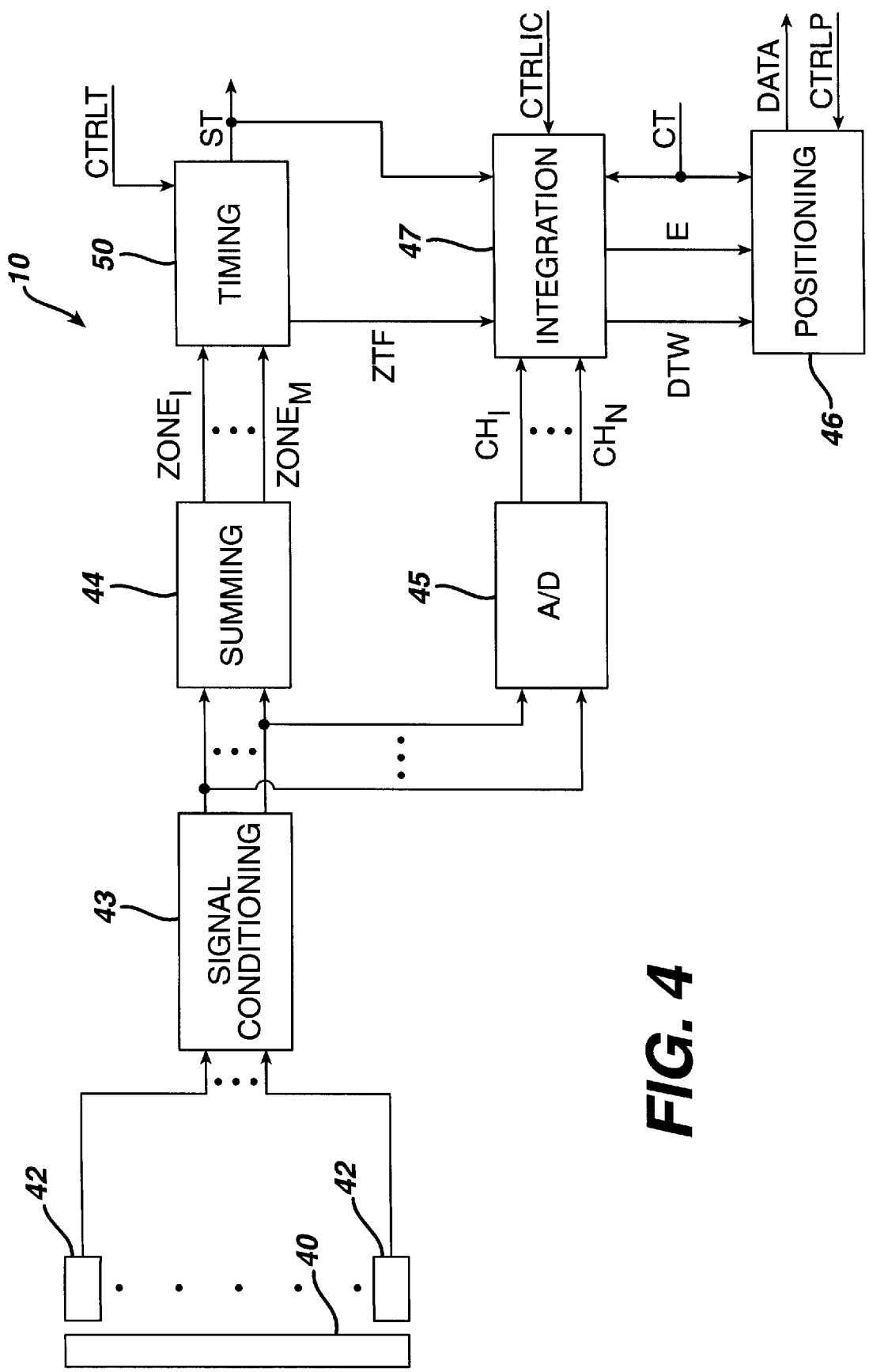
FIG. 4 illustrates internal components of a detector of the gamma camera system.

FIG. 4 illustrates the internal components of a detector 10, according to one embodiment. The detectors 10 may be assumed to be identical for purposes of the present invention. The detector 10 includes a scintillation crystal 40, such as a NaI(Tl) crystal, which is optically coupled to a number of PMTs 42. The outputs of the PMTs 42 are applied to signal conditioning circuit 43. The signal conditioning circuit 43 provides amplification and normalization of the PMT outputs and, if needed, other types of signal conditioning. The signal conditioning circuit 43 outputs, for each PMT output, a separate amplified signal to both summing network 44 and to analog-to-digital (A/D) circuit 45. The A/D circuit 45 converts the amplified PMT outputs to digital values, which are provided as channel signals $CH_i$ to integration circuitry 47 (i=1, 2, . . . , N, where N is the number of PMTs in the detector).

The selective integration is implemented, at least in part, using integration circuitry 47, as will be further described below. Generally, integration circuitry 47 integrates event pulses in the channel signals $CH_i$, to produce integrated energy (E) values, which are provided to positioning circuitry 46. Integration circuitry 47 also generates a digital trigger word (DTW) signal, which is also provided to positioning circuitry 46. The DTW signal is a multi-bit digital value, i.e., one bit for each PMT in the detector. The state of each DTW bit at any given point in time indicates whether the corresponding PMT is affected by the most recently detected scintillation event based on its integrated energy E. Further, integration circuitry 47 corrects for pre-pulse pile-up and performs pulse tail extrapolation. Integration circuitry 46 may be controlled, at least in part, by integration control signals CTRLIC from processing system 18, which are a subset of the above-mentioned CTRL signals.

Positioning circuitry 46 computes position (x,y) coordinates associated with scintillation events. In response to assertion of the appropriate signal, positioning circuitry 46 registers the position and energy (E) data for a corresponding scintillation event and provides the data to the processing system 18 via the DATA signal. Positioning circuitry 46 may be controlled, at least in part, by position control signals CTRLP from processing system 18, which are a subset of the CTRL signals.

Figure 5:
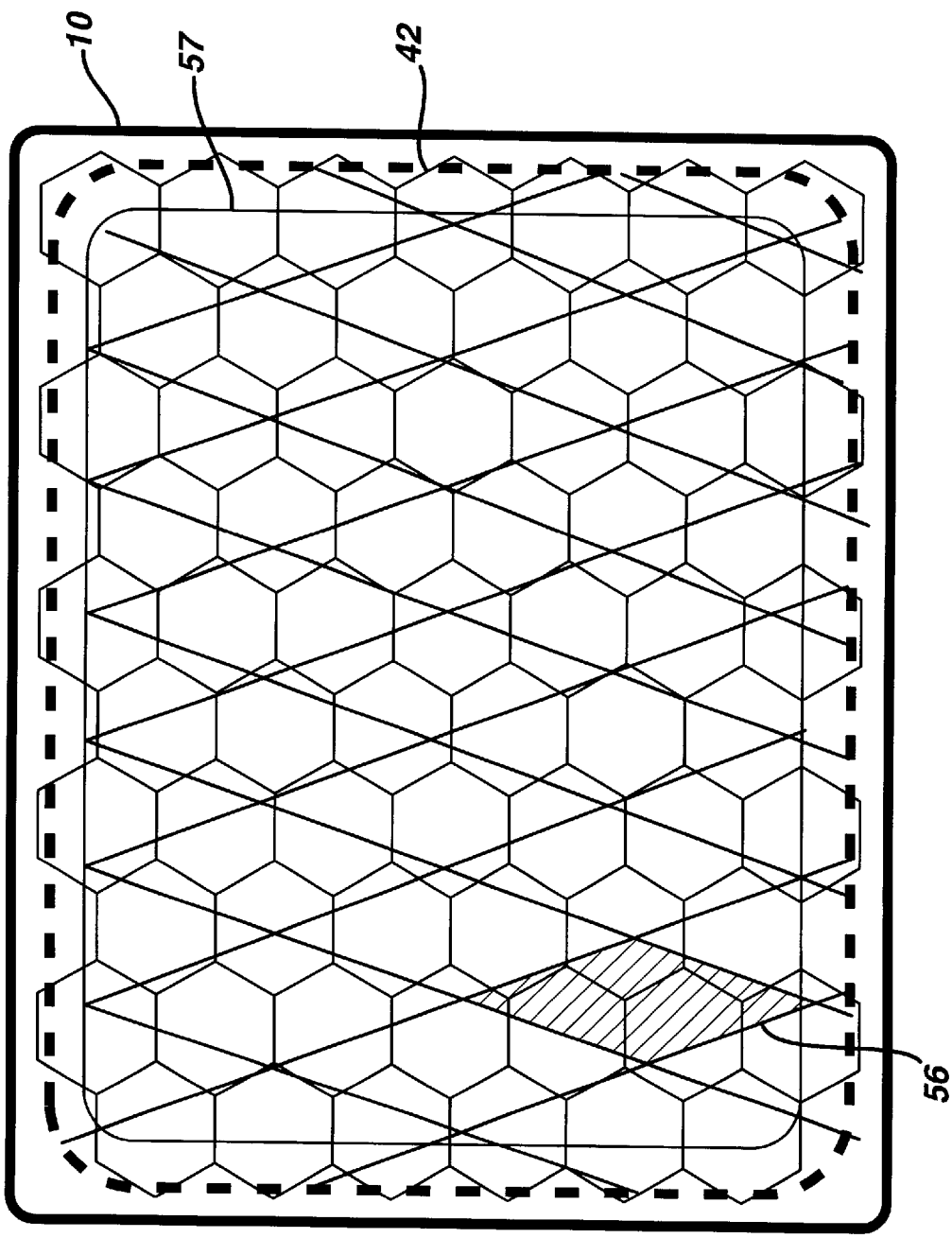
FIG. 5 illustrates a detector imaging surface divided into a number of zones.

The imaging surface of each of the detectors 10 is divided into a number of timing zones. Each timing zone includes a subset of the array PMTs 42. FIG. 5 illustrates the imaging surface of a detector 10, and an example of how the imaging surface may be divided into timing zones. One timing zone 56 is shaded for purposes of illustration. Note that many variations are possible in the number and shape of the timing zones, for purposes of the present invention. That is, the particular number of zones, zone shapes, and zone arrangements are not germane to the present invention.

Thus, referring again to FIG. 4, the summing network 44 receives the amplified outputs of the individual PMTs from the signal conditioning circuit 43 and sums the amplified outputs to generate one output $ZONE_j$ for each timing zone (j=1, 2, ..., M, where M is the number of timing zones on the detector). Summing network 44 then provides each zone output ZONEj to timing circuitry 50. Timing circuitry 50 applies a signal-level threshold function to the zone outputs $ZONE_j$ and, for the zone outputs $ZONE_j$, that meet the threshold level, generates pulses of singles trigger ST signal. Timing circuitry 50 also generates a zone trigger function (ZTF) signal in response to each scintillation event which meets the threshold level, which is provided to integration circuitry 47. The ZTF signal is a multi-bit digital value, i.e., one bit for each PMT in the detector. The state of each ZTF bit at any given point in time indicates whether the corresponding PMT is affected by the most recently detected scintillation event. Note that while DTW and ZTF contain substantially similar information, ZTF indicates pre-integration trigger status, whereas DTW indicates post-integration trigger status. Also, note that timing circuitry 50 may be controlled, at least in part, by timing control signals CTRLT from processing system 18, which represent a subset of the CTRL signals.

Figure 6:
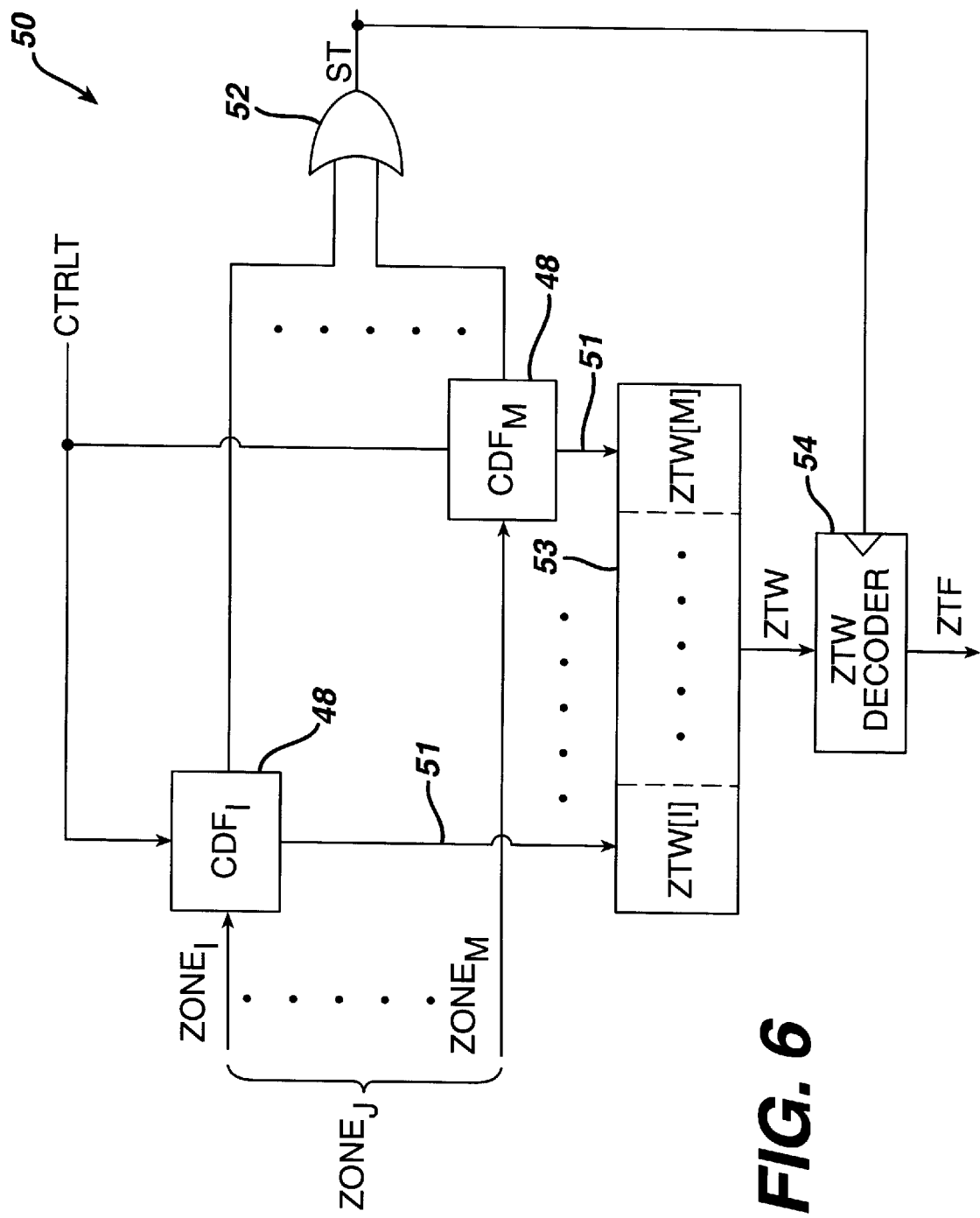
FIG. 6 illustrates the timing circuit of one of the detectors.

FIG. 6 illustrates the timing circuit 50 in greater detail. Timing circuitry 50 includes a number of constant fraction discriminators (CFDs) 48, i.e., one CFD 48 for each timing zone. Each of the zone outputs $ZONE_j$ is applied as input to a corresponding CFD 48. The CFDs 48 each provide amplitude independent triggering to maintain tight timing tolerances. The details of the CFDs are not germane to the present invention. Each CFD 48 provides an output signal to an OR gate 52. The output of OR gate 52 is the trigger signal ST from the detector 10, which is applied to CDC 36 (FIG. 3). Each CFD 48 also outputs a signal 51 to ZTW register 49; each such signal 51 determines the state of a corresponding bit of ZTW register 49. Thus, the ZTW register 53 includes one bit for each timing zone, and the state of the ZTW bits identifies the particular zones that responded to a scintillation event for each timing cycle. The output ZTW of the ZTW register 53 is applied to ZTW decoder 54. ZTW decoder 54 maps the ZTW value to individual PMTs; that is, ZTW decoder determines which PMT channels are represented by each ZTW value. The mapping function is based on knowledge of which PMTs are included within each timing zone and their arrangement and the known light spread function (LSF). The output of ZTW decoder 54 is signal ZTF, which includes one bit for each PMT channel, and which is provided to integration circuitry 47 (FIG. 4), as noted above.

Figure 7:
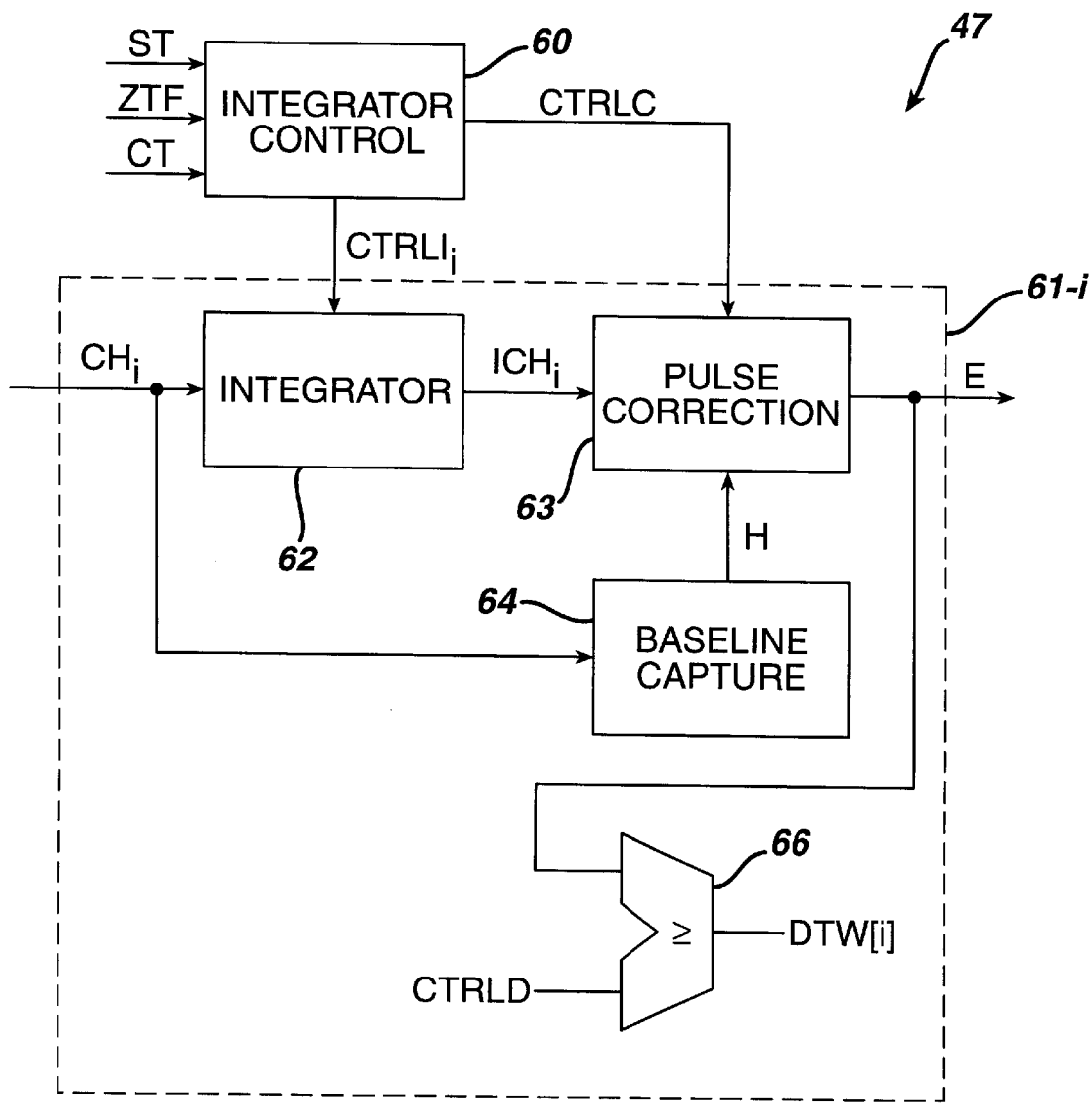
FIG. 7 is a block diagram of the integration circuitry of the gamma camera system.

FIG. 7 illustrates integration circuitry 47 in greater detail. Integration circuitry 47 includes an integrator control circuit 60 and a number of integration/correction circuits 61-$i$, i.e., one for each channel. Only one integration/correction circuit 61-$i$ (i.e., for channel i) is shown in FIG. 7; all such circuits in the detector may be assumed to be identical for purposes of the present invention. As shown, each integration/correction circuit 61 includes an integrator 62, a pulse correction circuit 63, a base line capture circuit 64, and a comparator 66. The integrator control circuit 60 receives as input the singles trigger signal ST, the coincidence trigger signal CT, and the multibit ZTF value. The integrator control circuit 60 provides control signals $CTRLI_i$ to integrator 62 and provides control signal CTRLC to pulse correction circuit 63. Integrator 62 integrates the energy of pulses represented in signal $CH_i$ in response to control signal CTRLL$i$. Control signal $CTRLI_i$ signals integrator 62 to integrate in response to assertion of coincidence trigger signal CT when the system is configured for coincidence mode imaging and in response to singles trigger signal ST when the system is configured SPECT mode.

As noted above, signal ZTF indicates which particular channels are affected by a given event. Accordingly, in response to the appropriate trigger signal, ST or CT, integrator control 60 provides control signal CTRLL$i$ to the integrator 62 of the appropriate channels. When a second pulse occurs during integration of a first pulse, integrator control circuit 60 determines, based on ZTF, which channels are affected by the second pulse and commands the integrators 62 of only those channels affected by the second pulse to stop integrating, via control signals CTRLL$i$. All other channels affected by the first pulse continue integrating. Thus, in contrast with prior art techniques, pulse pile-up situations do not cause integration to stop for all channels, such that the loss of valuable energy and position information is reduced. This feature is therefore advantageous for meeting ultra-high counting rate requirements associated with coincidence detection in a monolithic gamma camera detector.

The integrator 62 of each channel provides an integrated channel signal $ICH_i$ representing the integrated energy of a pulse to the pulse correction circuit 63 of that channel. Pulse correction circuitry 63 performs correction for pre-pulse pile-up and/or performs pulse tail extrapolation or estimation. The output of pulse correction circuit 63 is a corrected energy value E, which is provided to the positioning circuitry 46 (FIG. 4). Pulse correction circuitry 63 is responsive to control signal CTRLC provided by integrator control circuitry 60, which indicates (at least) the current cycle of the current integration period.

The integration/correction circuit 61-$i$ also includes a baseline capture circuit 64, as noted above. The baseline capture circuit 64 determines the instantaneous energy value of the channel signal $CH_i$ and provides this value in signal H to pulse correction circuit 63. As will be described in greater detail below, pulse correction circuit 63 computes, based on the current countrate, the tail of a prior pulse for purposes of pre-pulse pile-up correction, or the tail of a current pulse for purposes of pulse tail extrapolation. In one embodiment, a pulse tail is computed as a triangular area approximation representing the integrated energy of the pulse tail; however, other approaches are possible. For example, a pulse tail may be computed as a simple baseline value based on countrate. Integration/correction circuitry 61-$i$ also includes a comparator 66, which applies a digital threshold to the corrected integrated energy value E, and outputs the result as one bit of the DTW signal. More specifically, comparator 66 causes the bit DTW[i] to be asserted when the corrected integrated energy E is greater than or equal to the value indicated by control signal CTRLD from processing system 18.

Figure 8A:
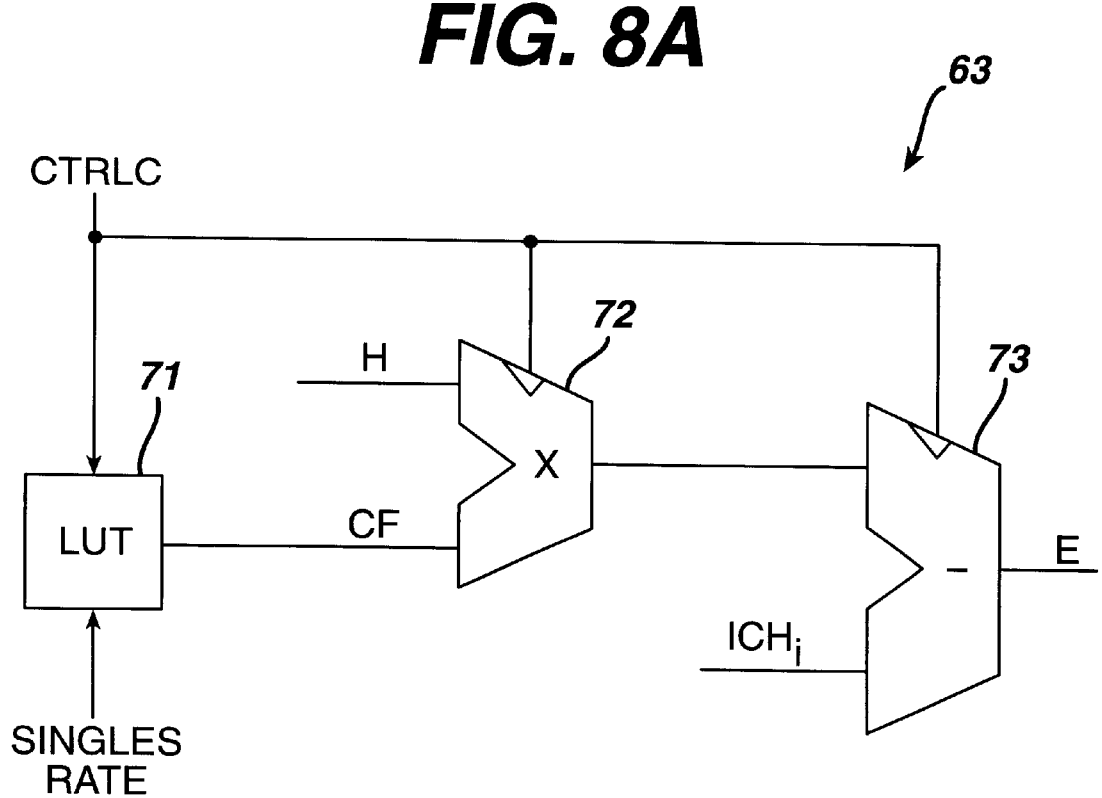
FIG. 8A shows pulse correction circuitry of the gamma camera system for correcting for pre-pulse pile up and/or for performing pulse tail extrapolation.

FIG. 8A illustrates the pulse correction circuit 63 in greater detail for one particular channel. In the illustrated embodiment, the pulse correction circuit 63 includes a look-up table 71, a multiplier 72, and a subtractor 73, each of which receive control signal CTRLC for clocking and other purposes. As noted above, pre-pulse pile-up correction or pulse tail extrapolation may be performed by computing a pulse tail as an area approximation of integrated energy (e.g., a triangular area), based on the countrate and instantaneous energy of the pulse at the time pile-up is detected. An advantage of this technique is that it does not rely upon precise knowledge of when the pulse began, in contrast with prior art techniques. In addition, because the technique does not require complex calculations, a pulse tail can be computed quickly during the acquisition process, in contrast with prior art techniques.

As noted, in one embodiment a pulse tail is approximated as a triangular area representing integrated energy. Note that the area of a triangle can be represented as (½)BH, where B represents the length of the base of the triangle, and H represents the height of the triangle. For purposes of the present invention, therefore, the instantaneous energy value H of a pulse is used as the height of a triangular-shaped approximation of a pulse tail. The base B of the triangular approximation may be computed based on the assumption that all pulses decay to negligible levels after a fixed period of time, such as one microsecond, and on the cycle of the integration period during which the pile-up event is detected, as indicated by control signal CTRLC. The assumption of a constant pulse duration may be subject to error, however, and such error may be compensated for by scaling the quantity (½)BH by a factor that is based on the current singles countrate.

Thus, in the embodiment of FIG. 8A, the current singles rate is measured and is used to perform a look up in look-up table 71, which also receives control signal CTRLC. The contents of look-up table 71 include correction factors CF for various different countrates. Thus, the output of the look-up table 71 is a correction factor CF, which is based on the current (singles) countrate, the current cycle of the integration period, and the assumed fixed pulse duration (e.g., one microsecond). The correction factor CF represents the quantity (½)B, with a correction for countrate. A technique for generating the values in look-up table 71 is discussed below in connection with FIG. 8B. The countrate-dependent output CF of look-up table 71 is applied to one input of multiplier 72. The other input of multiplier 72 receives the instantaneous energy value, i.e., H in the quantity (½)BH, from baseline capture circuit 64. The two inputs of multiplier 72 are multiplied together and the product is provided to one input of subtractor 73. Subtractor 73 outputs the corrected energy value E as the difference between the integrated channel signal ICH$_i$, and the output of multiplier 72. If no correction is required, as indicated by the state of control signal CTRLC, then the subtraction operation is bypassed, such that the integrated channel signal ICH$_i$, is simply passed through to the output of subtractor 73 to form the energy value E.

Figure 8B:
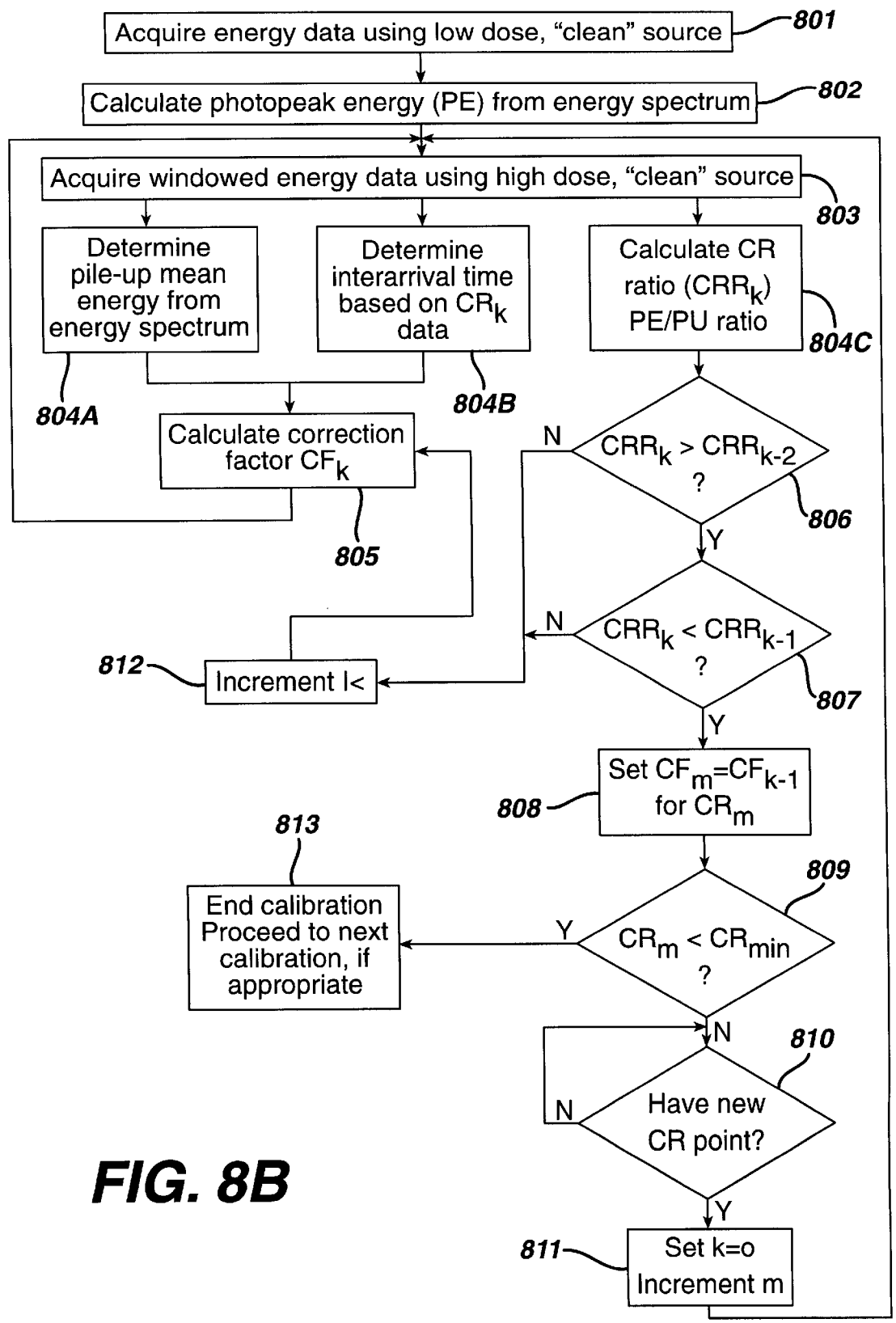
FIG. 8B is a flow diagram illustrating a routine for computing countrate based correction factors for use in pulse pile-up correction.

As noted above, the correction factor CF may be determined empirically. FIG. 8B illustrates an example of a procedure which may be used to generate the CF values for various countrates, for use in look-up table 71. First note that as countrate increases, so does the occurrence of pulse pile-up. When integrated, the additional measured energy resulting from pile-up tends to become misrepresented in a region of the energy spectrum above the photopeak of the radiation source. Consequently, the following procedure determines the correction factors CF for different countrates as the source decays, in an iterative manner designed to increase the number of counts in the photopeak region while reducing the number of counts in the pile-up region.

Referring now to FIG. 8B, initially an energy spectrum of a representative radiation source is measured to determine the photopeak energy level of the source, which represents a reference level. Thus, at 801 a low dose, "clean" source (i.e., a source having a single, well-defined photopeak) is placed at a designated spot in the field of view of a detector and energy data is acquired. At 802, the photopeak energy PE of the source is determined from the resulting energy spectrum. Next, the low dose source is replaced with a high dose, clean source. Accordingly, at 803, windowed energy data is acquired for the high dose source. The routine then proceeds from 803 to 804A, 804B and 804C. At 804A, the pile-up mean energy is computed from the energy spectrum, i.e., from a selected energy window that is assumed to represent the pile-up energy region. At 804B, the interarrival time between pulses is determined based on the current (energy-windowed) countrate CR$k$. At 804C, the ratio CRR$k$ of the countrate for the photopeak window to the countrate for the pile-up window is computed; also at 804C, the ratio of the photopeak energy PE to the pile-up energy PU (defined by the window) is calculated. Following 804C, it is determined whether the current countrate ratio CRR$k$ has reached a maximum value. Thus, following 804C it is determined at 806 whether CRR$k$ is greater than CRR$k-2$. If not, then the peak CRR has not been reached; accordingly, the index k is incremented by one at 812, and the routine proceeds to 805. At 805 (which also is performed following 804A or 804B), the correction factor CF$k$ is calculated. In one embodiment, the calculation involves a minor perturbation of the previously calculated CF value. The initial CF value may be a seed value, i.e., an expected correction factor CF for a given countrate. If CRR$k$ is determined to be greater than CRR$_{k-2}$ at 806, then at 807 it is determined whether CRR$k$ is less than CRR$k-1$. If not, then the routine proceeds to 812 as described above. If so, then the peak CRR has been passed (CRR$_{k-1}$); consequently, at 808 the correction factor CF$m$ is set equal to CF$k-1$, where CF$M$ is the correction factor for the mth countrate CR$m$. Following 808, it is determined at 809 whether countrate CR$k$ is below a minimum countrate threshold CR$min$. If not, then when the next countrate point has been reached (due to decay of source activity) at 810, the index k is reset and the index m is incremented by one at 811, and the routine then repeats from 803 with the acquisition of energy data at the new countrate point. If the countrate CR$k$ is below the minimum countrate CR$min$, then the routine ends at 813. Another calibration may then be performed, if appropriate. At the end of the routine, a number of correction factors CF have been generated for various countrates. This data may then be loaded into look-up table 71 (FIG. 8A) for use in pile-up correction, as described above.

Figure 10:
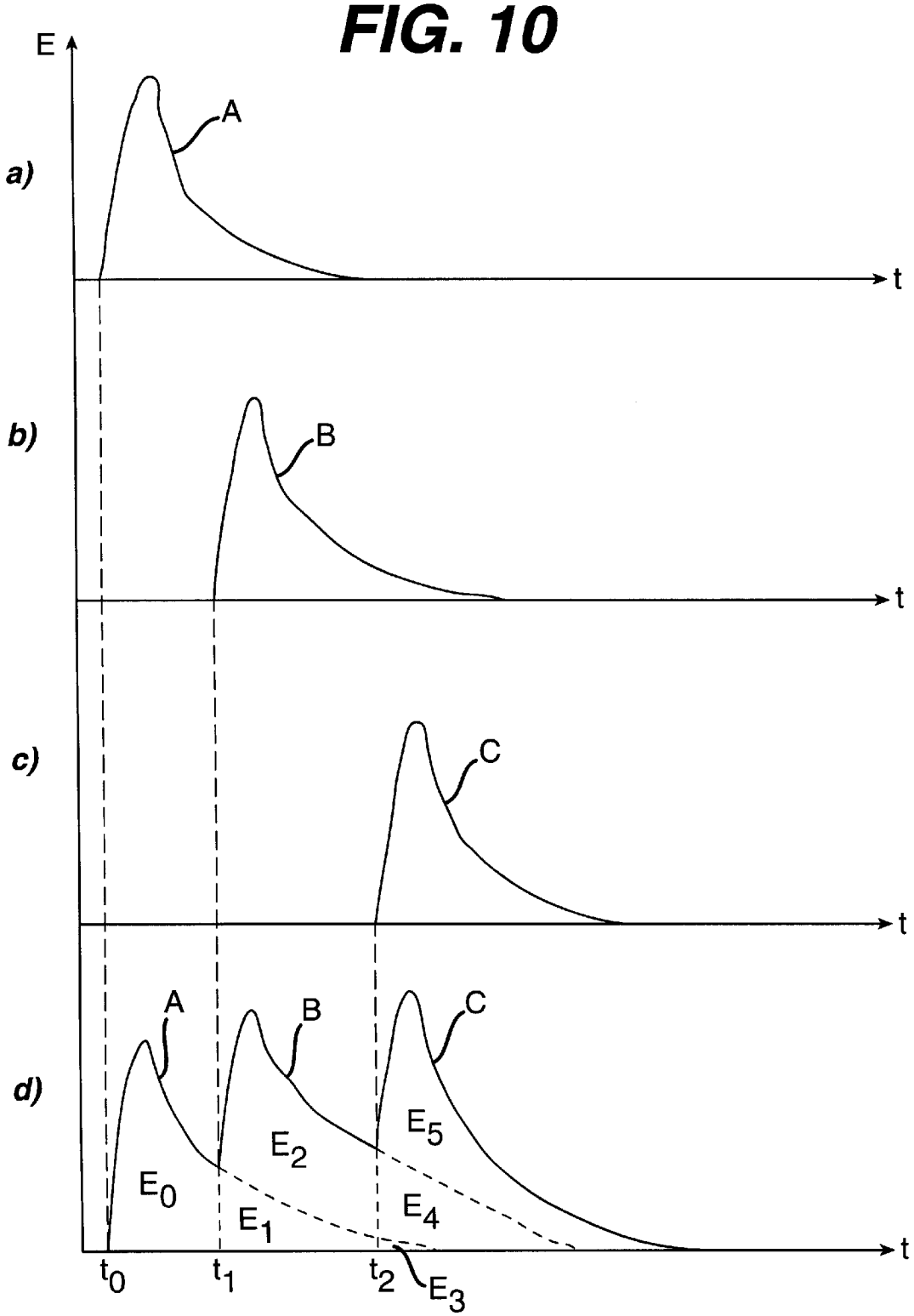
FIG. 10 shows the timing of three event-based pulses for an illustrative case.
Figure 11:
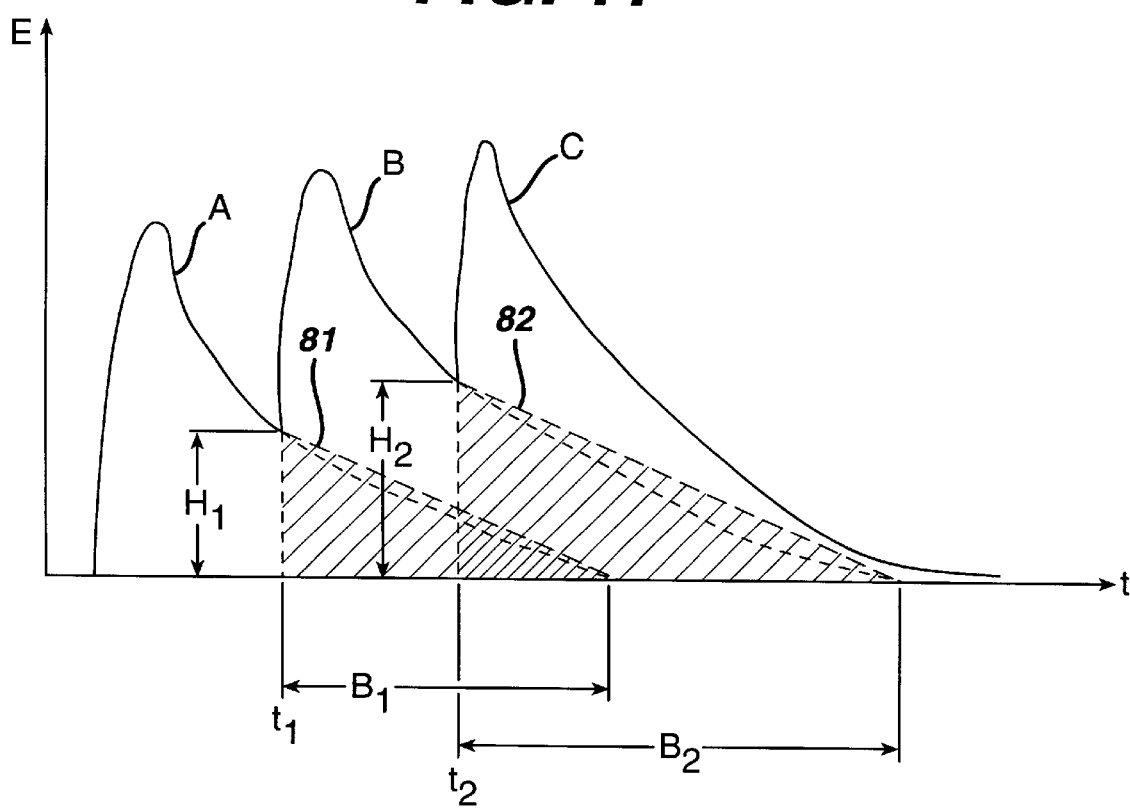
FIG. 11 illustrates triangular approximations used to correct for pulse pile-up.

The operation of the selective integration and pile-up correction features are now further described with reference to FIGS. 9 through 13. FIG. 9 illustrates the imaging surface of one of the detectors 10 and the coverage areas of three scintillation events that overlap spatially. It is assumed that these events also overlap temporally, as illustrated in FIGS. 10 and 11. A first scintillation event covers an area A on the imaging surface of the detector 10. The PMT channels affected by the first event are the PMTs which fall at least partially within the shaded area A, and which meet the threshold function applied by the CFDS. Following the first event, a second event covers an area represented by shaded area B on the imaging surface. Similarly, following the second event, a third event covers the shaded area C on the imaging surface.

Referring now to FIG. 10, the temporal overlap of the three events is illustrated. Specifically, timelines A, B, and C show the event pulses associated with events A, B, and C in FIG. 9, respectively. Timelines a), b), and c) show these event pulses as they would appear without distortion from each other's energy. In contrast, timeline d) shows the more realistic representation of the relative energy values of these three event pulses, taking into account the energy distortions. Due to the tail of pulse A overlapping pulse B, pulse B has a higher peak energy value than it should have. Similarly, event pulse C has a higher peak energy value than it should have, due to its overlap with tails of pulses A and B.

Assume now that the gamma camera system is configured for coincidence imaging. Assume further that a valid coincidence trigger signal CT occurs at time $t_0$. Accordingly, integration of pulse A begins at time $t_0$. Assume further that event pulse B represents a singles event. Accordingly, at time $t_1$ a singles trigger signal ST is asserted. In response, each channel that is affected by both events A and B stops integrating event pulse A at time $t_1$. (Note that if event pulse B were instead a coincidence event and had therefore generated a coincidence trigger CT, a new integration period would be initiated at time $t_1$. Conversely, if the system were set for SPECT mode, singles event B would also cause a new integration period to begin.) Thus, to determine the integrated energy of event pulse A, portion $E_1$ of event pulse A is estimated using the above-described triangular approximation. This approximation is then added to portion $E_0$ to determine the total integrated energy of event pulse A. Thus, the total integrated energy of event pulse A can be represented as $E_0+E_1$.

Assume now that event pulse B is part of a coincidence event, and that accordingly, coincidence trigger signal CT is asserted in response to event pulse B at time $t_1$. In that case, integration of event pulse B begins at time $t_1$ and stops at time $t_2$ when either the coincidence trigger signal CT or the singles trigger ST is asserted at time $t_2$. Correction may be applied to the integrated energy of pulse B by subtracting an estimate of the tail of pulse A from the integrated energy of pulse B, i.e., by subtracting an estimate of portion $E_1$. Similarly, the tail of pulse B may be extrapolated by adding an estimate of portion $E_4$ to the integrated value of pulse B. The integrated value of pulse C can also be corrected by subtracting out the portions of the tails of pulses A and B, which overlap pulse C, i.e., by subtracting portions $E_3$ and $E_4$.

Thus, the following table summarizes the correction procedures that can be applied to compute pile-up corrected energy values for pulses A, B, and C.

| Pulse (Corrected) | | Measured (Integrated) | | Correction Added | | Correction Subtracted |
|---|---|---|---|---|---|---|
| A | = | $E_0$ | + | $E_1$ | − | 0 |
| B | = | $(E_1 + E_2)$ | + | $E_4$ | − | $E_1$ |
| C | = | $(E_3 + E_4 + E_5)$ | + | 0 | − | $(E_3 + E_4)$ |

FIG. 11 illustrates the triangular approximation technique of correcting for pre-pulse pile-up and/or performing pulse tail extrapolation, as applied to pulse B. As noted above, the measured value of pulse B is corrected by extrapolating the tail of pulse B (i.e., the portion of pulse B which overlaps pulse C), and by removing from pulse B the tail of pulse A (i.e., the portion of pulse A which overlaps pulse B). The area under the pulse curve represents integrated energy. Hence, the energy of pulse B may be corrected by subtracting out a triangular area 81 of length $B_1$ and height $H_1$ from the integrated (measured) value of pulse B. The tail of pulse B may then be extrapolated by adding a triangular area 82 with base of length $B_2$ and height $H_2$. Note that triangular area 82 includes the portion of pulse A's tail that overlaps pulse C. $H_1$ represents the instantaneous energy value measured on the channel of interest at time $t_1$, while $H_2$ represents the instantaneous energy value measured on the channel at time $t_2$. As noted above, quantities $B_1$ and $B_2$ are computed based upon an assumed constant pulse duration (e.g., one microsecond) and knowledge of the current cycle of the integration period, and are adjusted using a correction factor that is based on the singles rate. A technique for determining the correction factor may be determined from empirical data, as explained below.

Note that it is not necessary to apply the above-described approximation technique to both pre-pulse pile-up and post-pulse pile-up scenarios. That is, an alternative correction technique or no correction can be applied to a given type of pile-up, if desired. Also, whether to apply the above-described approximation to either type of pulse pile-up may be determined, at least in part, based on the amount of error that is acceptable in the system at hand.

Figure 12:
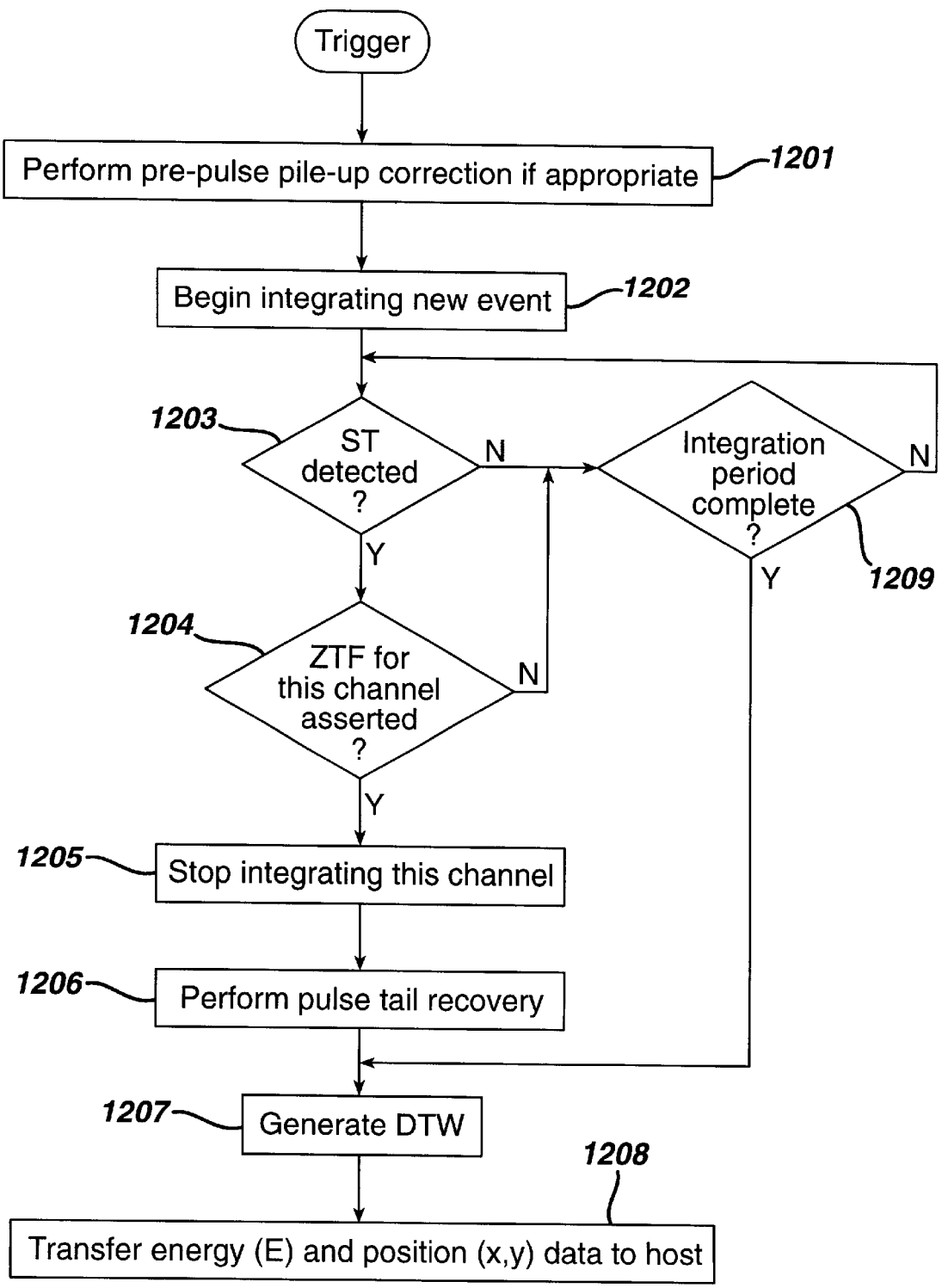
FIG. 12 is a flow diagram illustrating a routine for detecting scintillation events for a given PMT channel.

Refer now to FIG. 12, which illustrates an overall routine, associated with a given PMT channel, for detecting scintillation events. In response to a trigger signal (i.e., singles trigger ST or coincidence trigger CT, depending upon whether PET or SPECT mode is selected), at 1201, pulse correction circuitry 63 performs pre-pulse pile-up correction, if necessary. That is, such correction is performed if the current pulse (the pulse which initiated the trigger signal) was preceded by another overlapping pulse. If there was no preceding overlapping pulse, then such correction need not be performed. If performed, the pre-pulse pile-up correction may be based on countrate and/or may employ a triangular approximation, as described above. Next, at 1202, integration is initiated by integrator 62 (FIG. 7). Following 1202, the singles trigger ST is re-enabled after a predetermined period of time. If the singles trigger ST is subsequently detected at 1203, then it is determined at 1204 whether the ZTF bit for this channel is asserted. If the singles trigger ST has not been detected at 1203, then it is determined at 1209 whether the integration period is complete. If not, the routine repeats from 1203. If the integration period is complete, the routine proceeds from 1207, which is described below. If it is determined at 1204 that the ZTF bit for this channel is asserted, then at 1205, the integrator 62 stops integrating in response to control signal $CTRLI_1$ from integrator control circuit 60. Pulse tail recovery is then performed at 1206 using an appropriate estimation technique, such as the triangular approximation technique described above. Next, at 1207, the DTW is generated and at 1208 the energy (E) and position (x,y) data are transferred to the host processing system 18 and the routine ends.

Figure 13:
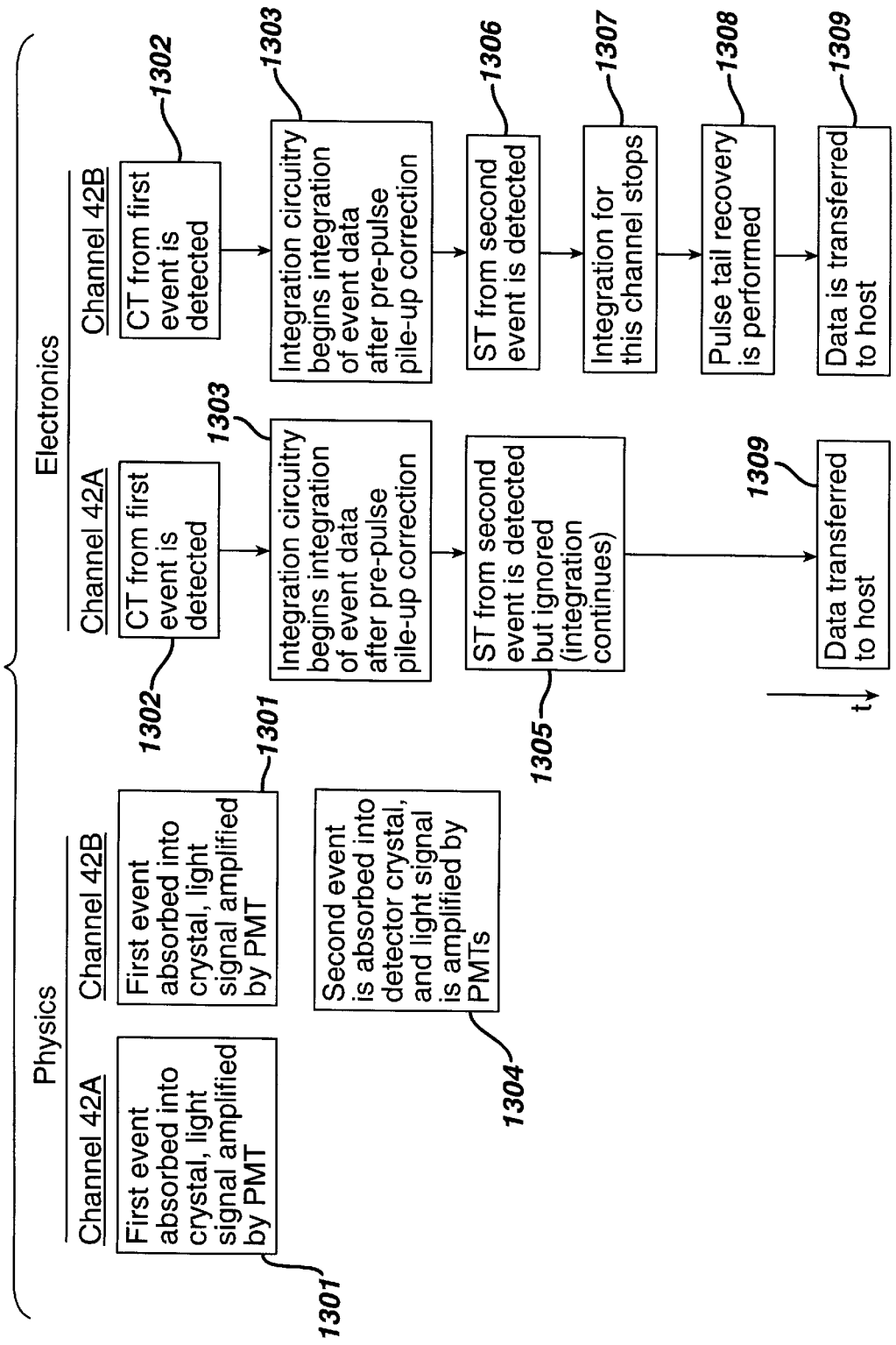
FIG. 13 shows an example of a sequence of events associated with detecting gamma rays in the presence of pulse pile-up.

FIG. 13 illustrates an example of a sequence of operations in connection with the above-described integration and correction techniques and the example of FIG. 9. The two left columns of FIG. 13 illustrate the physics associated with the sequence, while the two right columns illustrate corresponding operations of the electronics of a detector 10. The sequence is provided in connection with the two PMT channels 42A and 42B (see FIG. 9). A first event A is absorbed into the scintillation crystal and its light is amplified by the affected PMTs at 1301. Referring again to FIG. 9, event A affects both channel 42A and channel 42B. Assume that event A was a coincidence event. Accordingly, in response to event A, at 1302, the coincidence trigger signal CT is detected. At 1303, the integration circuitry 62 for each of channels 42A and 42B (and other channels) begins integrating the event pulse after pre-pulse pile-up correction, if needed.

At some point in time after integration of event A begins, a second event B is absorbed into the detector crystal and its light is amplified by the affected PMTs at 1304. Assume that event B is a singles event. As shown in FIG. 9, event B affects channel 42B, but not channel 42A. Accordingly, in response to event B, the singles trigger signal ST is detected but ignored by the integration circuitry of channel 42A. This singles trigger ST is ignored because the ZTF bit for this channel indicates that channel 42A is not affected by event B. In contrast, the same singles trigger ST is also detected by channel 42B at 1306. Because the ZTF bit for channel 42B indicates that channel 42B is affected by event B, integration for channel 42B stops at 1307. Consequently, at 1308 pulse tail extrapolation is performed for channel 42B using, for example, the countrate based approximation technique described above. At 1309, the corrected energy data and position data for channels 42A and 42B (and other affected channels) are transferred to the host processing system 18.

Thus, a method and apparatus for correcting for pulse pile-up in a gamma camera system have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of determining a tail of a pulse representing a scintillation event, the method comprising:
   detecting a first pulse;
   determining a countrate associated with the first pulse; and
   estimating the tail of the first pulse as a function of the countrate.

2. A method according to claim 1, further comprising determining an instantaneous value of the first pulse, wherein said estimating comprises estimating the tail of the first pulse based on the countrate and the instantaneous value.

3. A method according to claim 1, wherein said estimating comprises estimating the tail of the first pulse as an approximation of an area based on the instantaneous value and the countrate.

4. A method according to claim 2, wherein said estimating comprises estimating the tail of the first pulse as a triangular approximation based on the instantaneous value and the countrate.

5. A method according to claim 1, further comprising using the estimate to correct a measurement of a second pulse for pulse pile-up.

6. A method according to claim 5, wherein the second pulse occurs subsequent to the first pulse, and wherein said using the estimate to correct the measurement comprises using the estimate to correct an integration of the second pulse for pulse pile-up.

7. A method according to claim 1, further comprising using the estimate to complete a measurement of the first pulse.

8. A method according to claim 7, wherein said using the estimate to complete the measurement of the first pulse comprises combining the estimate with a partial integration of the first pulse.

9. A method of correcting a current pulse for pile-up resulting from a previous pulse in a gamma camera detector, the method comprising:
   integrating a portion of the current pulse;
   estimating a portion of the previous pulse that temporally overlaps the current pulse based on an instantaneous energy of the current pulse and a current countrate; and
   using the estimate to correct said integrating.

10. A method according to claim 9, wherein said estimating comprises estimating the portion of the previous pulse as an approximation of an area representing an integrated energy value.

11. A method according to claim 10, wherein the area is a triangular shaped area.

12. A method of measuring a pulse representing a scintillation event in a gamma camera system, the method comprising:
   integrating an initial portion of the pulse; and
   estimating a subsequent portion of the pulse as an area based on an instantaneous value of the pulse and a current countrate.

13. A method according to claim 12, wherein said estimating comprises computing the area as a substantially triangular-shaped area representing an integrated energy value.

14. A method of measuring a first pulse representing a scintillation event, the method comprising:
   beginning integration of the first pulse;
   in response to detecting a second pulse overlapping the first pulse temporally:
      stopping integration of the first pulse;
      determining an instantaneous energy of the first pulse; and
      computing an estimate of a tail of the first pulse as a based on the instantaneous energy and a current countrate.

15. A method according to claim 14, wherein said computing the estimate comprises computing the estimate of the pulse tail of the first pulse as a triangular area approximation based on the instantaneous energy and the countrate.

16. An apparatus for determining a pulse tail of a pulse representing a scintillation event, the apparatus comprising:
   means for detecting a first pulse;
   means for determining a countrate associated with the first pulse; and
   means for estimating the tail of the first pulse as a function of the countrate.

17. An apparatus according to claim 16, further comprising means for determining an instantaneous value of the first pulse, wherein said means for estimating comprises means for estimating the tail of the first pulse based on the countrate and the instantaneous value.

18. An apparatus according to claim 17, wherein said means for estimating comprises means for estimating the tail of the first pulse as an approximation of an area based on the instantaneous value and the countrate.

19. An apparatus according to claim 16, wherein said means for estimating comprises means for estimating the tail of the first pulse as a triangular approximation based on the instantaneous value and the countrate.

20. An apparatus according to claim 16, further comprising means for using the estimate to correct a measurement of a second pulse for pulse pile-up.

21. An apparatus according to claim 20, wherein the second pulse occurs subsequent to the first pulse, and wherein said means for using the estimate to correct the measurement comprises means for using the estimate to correct an integration of the second pulse for pulse pile-up.

22. An apparatus according to claim 16, further comprising means for using the estimate to complete a measurement of the first pulse.

23. An apparatus according to claim 22, wherein said means for using the estimate to complete the measurement of the first pulse comprises means for combining the estimate with a partial integration of the first pulse.

24. An imaging system comprising:

a support structure;

a radiation detector coupled to the processing system and supported by the support structure, the radiation detector including a plurality of channels, each configured to generate pulses in response to scintillation events, the radiation detector further including integration circuitry configured to integrate a portion of a current pulse, to estimate a portion of a previous pulse that temporally overlaps the current pulse based on an instantaneous value of the current pulse and a countrate associated with the current pulse; and to use the estimate to correct said integrating; and a processing system coupled to receive corrected integrated pulse data from the radiation detector.

25. An imaging system according to claim 24, wherein the integration circuitry is further configured to estimate the portion of the previous pulse as an area approximation representing an integrated energy value.

26. An imaging system according to claim 25, wherein the area approximation is substantially triangular.

27. A radiation detector comprising:

a plurality of channels to generate pulses in response to radiation-induced events; and an integration unit to integrate a portion of a first pulse from at least one of the channels, and to estimate a portion of a previous pulse that overlaps the first pulse as a function of countrate.

28. A radiation detector according to claim 27, wherein the integration unit determines an instantaneous value of the first pulse and estimates the portion of the previous pulse which overlaps the first pulse based on the countrate and the instantaneous value.

29. A radiation detector according to claim 27, wherein the integration unit estimates said portion as an approximation of an area based on the instantaneous value and the countrate.

30. A radiation detector according to claim 29, wherein the integration unit estimates said portion as a triangular approximation based on the instantaneous value and the countrate.

31. A radiation detector according to claim 27, wherein the integration unit uses a result of the estimate to correct a measurement of a second pulse for pulse pile-up.

32. A radiation detector according to claim 31, wherein the second pulse occurs subsequent to the first pulse, and wherein the integration unit uses the estimate to correct an integration of the second pulse for pulse pile-up.

33. A radiation detector according to claim 27, wherein the integration unit uses the estimate to complete a measurement of the first pulse.

34. A radiation detector according to claim 33, wherein the integration unit combines the estimate with a partial integration of the first pulse.

* * * * *